(12) United States Patent
Sugiyama et al.

(10) Patent No.: US 7,942,381 B2
(45) Date of Patent: May 17, 2011

(54) SOLENOID VALVE AND FUEL INJECTION VALVE HAVING THE SAME

(75) Inventors: Kouichi Sugiyama, Nagoya (JP); Kazunari Kuroiwa, Anjo (JP)

(73) Assignee: Denso Corporation, Kariya (JP)

( * ) Notice: Subject to any disclaimer, the term of this patent is extended or adjusted under 35 U.S.C. 154(b) by 622 days.

(21) Appl. No.: 12/053,043

(22) Filed: Mar. 21, 2008

(65) Prior Publication Data
US 2008/0237520 A1 Oct. 2, 2008

(30) Foreign Application Priority Data

Mar. 26, 2007 (JP) ................................ 2007-078478
Jan. 25, 2008 (JP) ................................ 2008-015037

(51) Int. Cl.
*F16K 31/02* (2006.01)

(52) U.S. Cl. ................. 251/129.21; 239/585.1; 335/299

(58) Field of Classification Search ............. 251/129.15, 251/129.21; 239/585.1, 585.2, 585.3, 585.4, 239/585.5; 335/299
See application file for complete search history.

(56) References Cited

U.S. PATENT DOCUMENTS

| | | | |
|---|---|---|---|
| 5,236,174 A | 8/1993 | Vogt et al. | |
| 5,494,225 A * | 2/1996 | Nally et al. | ................ 239/585.5 |
| 5,769,391 A | 6/1998 | Noller et al. | |
| 5,865,907 A | 2/1999 | Katayama et al. | |
| 6,402,061 B1 | 6/2002 | Fukutomi et al. | |
| 6,666,389 B2 * | 12/2003 | Ito et al. | ..................... 239/585.1 |
| 6,669,166 B2 * | 12/2003 | Enomoto et al. | ......... 251/129.15 |
| 7,296,781 B2 * | 11/2007 | Akabane | ................... 251/129.21 |
| 7,503,543 B2 * | 3/2009 | Nomichi et al. | .......... 251/129.15 |
| 7,703,709 B2 * | 4/2010 | Akabane et al. | .............. 239/585.1 |
| 7,770,823 B2 * | 8/2010 | Kubota et al. | ............ 239/533.14 |
| 2002/0043575 A1 | 4/2002 | Sekine et al. | |
| 2004/0050978 A1 | 3/2004 | Sugiyama et al. | |
| 2004/0135014 A1 | 7/2004 | Sekine et al. | |
| 2005/0098665 A1 | 5/2005 | Fukutomi | |
| 2006/0028311 A1 | 2/2006 | Burger et al. | |

FOREIGN PATENT DOCUMENTS

JP 2006-002780 1/2006

OTHER PUBLICATIONS

German Office Action dated Jul. 14 2009 issued in corresponding German Application No. 10 2008 000 797.8-12, with English translation.
Japanese Office Action dated Dec. 12, 2008 issued in corresponding Japanese Application No. 2008-015037, with English translation.

* cited by examiner

*Primary Examiner* — John K Fristoe, Jr.
(74) *Attorney, Agent, or Firm* — Nixon & Vanderhye PC (57) ABSTRACT

A solenoid valve includes a movable core, a magnetic opposed portion opposed to the movable core, a nonmagnetic cylindrical portion, a first magnetic cylindrical portion axially close to the movable core, and a second magnetic cylindrical portion located radially outside of the magnetic opposed portion. The nonmagnetic cylindrical portion surrounds radially outside of a gap between the magnetic opposed portion and the movable core. A coil is provided radially outside of the nonmagnetic cylindrical portion. A thickness t of the nonmagnetic cylindrical portion, a cross-sectional area S1 of the magnetic opposed portion, and a total cross-sectional area S2 of both the magnetic opposed portion and the second magnetic cylindrical portion having the thickness t satisfy the relationships of $t \leq 0.6$ mm and $0.55 \leq (S1/S2)$.

15 Claims, 7 Drawing Sheets

SOLENOID VALVE AND FUEL INJECTION VALVE HAVING THE SAME

CROSS REFERENCE TO RELATED APPLICATIONS

This application is based on and incorporates herein by reference Japanese Patent Applications No. 2007-78478 filed on Mar. 26, 2007 and No. 2008-15037 filed on Jan. 25, 2008.

FIELD OF THE INVENTION

The present invention relates to a solenoid valve. The present invention further relates to a fuel injection valve having the solenoid valve.

BACKGROUND OF THE INVENTION

For example, U.S. Pat. No. 5,769,391 (JP-A-11-500509) discloses a fuel injection valve having a solenoid valve including a stationary core, a movable core, a valve element, and a coil. When the coil is energized, the stationary core and the movable core therebetween generate magnetic attractive force to manipulate the valve element together with the movable core so as to control communication in a fluid passage for intermitting fuel injection. In U.S. Pat. No. 5,769,391, a movable core side magnetic portion surrounds an outer circumferential periphery of the movable core. The movable core side magnetic portion and a stationary core side magnetic portion therebetween define a magnetism throttle. The movable core side magnetic portion, the stationary core side magnetic portion, and the magnetism throttle are integrated into one component. In U.S. Pat. No. 5,769,391, the magnetism throttle restricts the movable core side magnetic portion and the stationary core side magnetic portion from magnetically short-circuiting therebetween when a coil is energized. Thus, the movable core and the stationary core generate magnetic attractive force in a gap therebetween.

In U.S. Pat. No. 5,769,391, the magnetic throttle is formed from a magnetic material, whereby the movable core side magnetic portion and the stationary core side magnetic portion can be restricted from magnetically short-circuiting, nevertheless magnetic flux may leak through the magnetism throttle. As a result the magnetic attractive force between the movable core and the stationary core may decrease.

Alternatively, it is conceivable to provide a nonmagnetic portion, instead of the magnetic throttle, which is formed from the magnetic material. In this case, the nonmagnetic portion is provided between the movable core side magnetic portion and the stationary core side magnetic portion to surround radially outside a gap, which is defined between the movable core and the stationary core. In the present structure, the nonmagnetic portion is capable of restricting the movable core side magnetic portion and the stationary core side magnetic portion from magnetically short-circuiting therebetween.

However, in the present structure, an eddy current may arise in the nonmagnetic portion when the coil is de-energized and magnetic flux quickly reduces in the gap. When an eddy current arises in the non-magnetic portion, which is located radially outside the gap, magnetic flux may be induced in the magnetic portion in the vicinity of the gap. Consequently, magnetic attractive force between the stationary core and the movable core may be retained for a long period. Consequently, response of the valve element of the solenoid valve may be impaired when the coil is de-energized.

SUMMARY OF THE INVENTION

In view of the foregoing problems, it is an object of the present invention to produce a solenoid valve configured to quickly actuate a valve element when being de-energized. It is another object of the present invention to produce a fuel injection valve having the solenoid valve.

According to one aspect of the present invention, a solenoid valve comprises a movable core. The solenoid valve further comprises a valve element configured to move together with the movable core so as to control fluid communication. The solenoid valve further comprises a magnetic opposed portion located farther away from the valve element than the movable core and opposed to the movable core, the magnetic opposed portion and the movable core being configured to therebetween define a gap. The solenoid valve further comprises a nonmagnetic cylindrical portion surrounding radially outside of the gap. The solenoid valve further comprises a first magnetic cylindrical portion located axially closer to the movable core than the nonmagnetic cylindrical portion. The solenoid valve further comprises a second magnetic cylindrical portion located around an outer circumferential periphery of the magnetic opposed portion, the magnetic opposed portion being located axial farther away from the first magnetic cylindrical portion than the nonmagnetic cylindrical portion. The solenoid valve further comprises a coil located around an outer circumferential periphery of the nonmagnetic cylindrical portion, the coil being configured to generate magnetic attractive force between the magnetic opposed portion and the movable core when being energized. The nonmagnetic cylindrical portion has a thickness t. The magnetic opposed portion has a cross-sectional area S1. The magnetic opposed portion and a cylindrical member which retains the magnetic opposed portion and has the thickness t, have a total cross-sectional area S2. The thickness t, the cross-sectional area S1, and the total cross-sectional area S2 satisfy $t \leq 0.6$ mm and $0.55 \leq (S1/S2)$.

According to another aspect of the present invention, a solenoid valve comprises a movable core. The solenoid valve further comprises a valve element configured to move together with the movable core so as to control fluid communication. The solenoid valve further comprises a magnetic opposed portion located farther away from the valve element than the movable core and opposed to the movable core, the magnetic opposed portion and the movable core being configured to therebetween define a gap. The solenoid valve further comprises a nonmagnetic cylindrical portion surrounding radially outside of the gap. The solenoid valve further comprises a first magnetic cylindrical portion located axially closer to the movable core than the nonmagnetic cylindrical portion. The solenoid valve further comprises a second magnetic cylindrical portion located around an outer circumferential periphery of the magnetic opposed portion, which is located axially farther away from the first magnetic cylindrical portion than the nonmagnetic cylindrical portion. The solenoid valve further comprises a coil located around an outer circumferential periphery of the nonmagnetic cylindrical portion, the coil being configured to generate magnetic attractive force between the magnetic opposed portion and the movable core when being energized. The nonmagnetic cylindrical portion has a thickness less than or equal to 0.6 mm. The nonmagnetic cylindrical portion has at least one recess.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1:
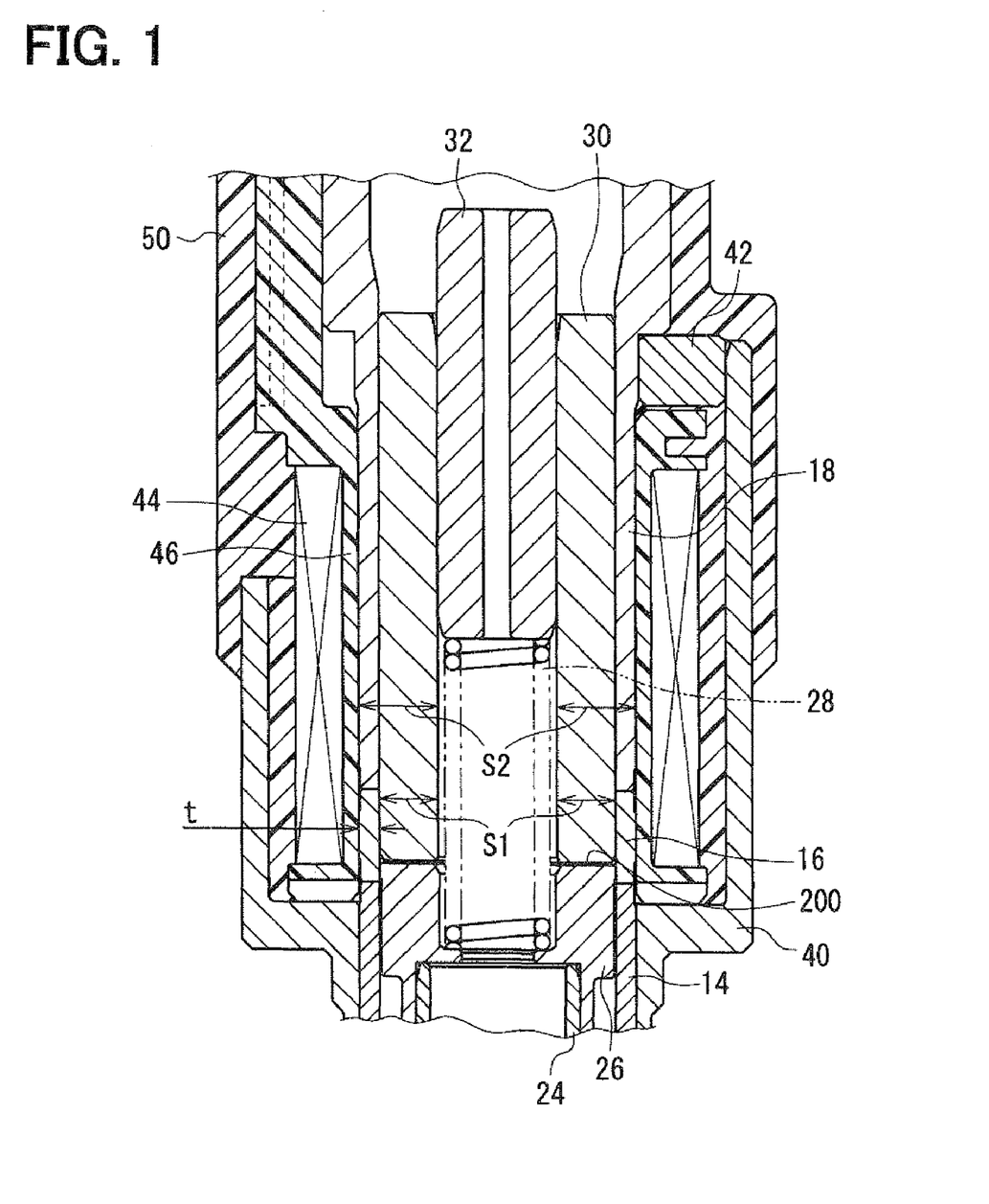
FIG. 1 is a sectional view showing a stationary core and a movable core, which are opposed to each other, in a fuel injection valve according to a first embodiment.
Figure 2:
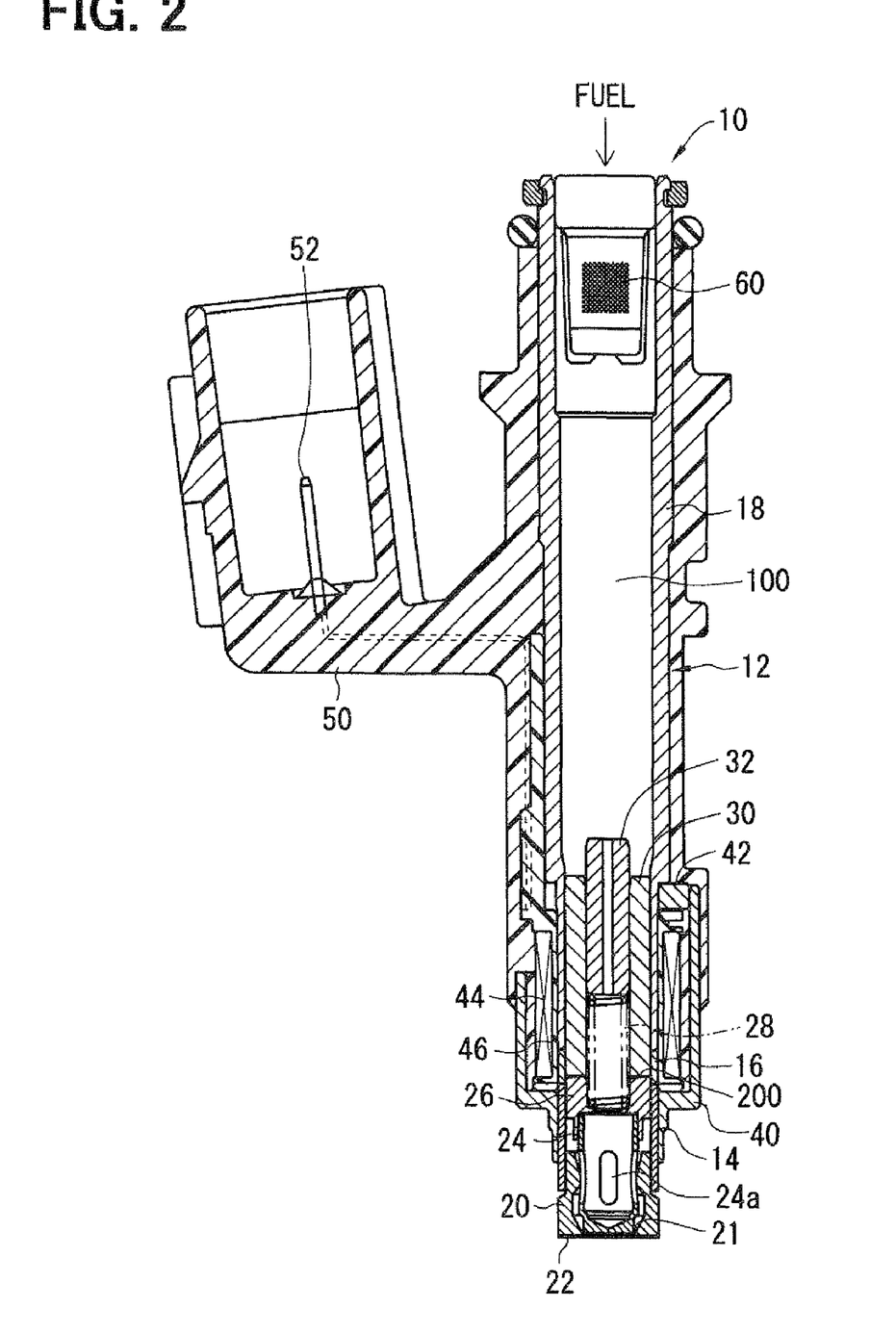
FIG. 2 is a sectional view showing the fuel injection valve according to the first embodiment.

As shown in FIGS. 1, 2, a fuel injection valve 10 is provided to, for example, a gasoline engine. A cylindrical member 12 is a substantially cylindrical member formed from a magnetic material or a nonmagnetic material. The cylindrical member 12 has a fuel passage 100, which accommodates a valve body 20, a valve element 24, a movable core 26, a spring 28, a stationary core 30, and the like.

Referring to FIG. 2, the cylindrical member 12 has a first magnetic cylindrical member 14, a nonmagnetic cylindrical member 16, and a second magnetic cylindrical member 18, which are arranged in this order from the valve body 20 located on the lower side thereof. The first magnetic cylindrical member 14, the nonmagnetic cylindrical member 16, and the second magnetic cylindrical member 18 are integrally joined with each other by, for example, laser welding. The first magnetic cylindrical member 14, the nonmagnetic cylindrical member 16, and the second magnetic cylindrical member 18 respectively correspond to a first magnetic cylindrical portion, a nonmagnetic cylindrical portion, and a second magnetic cylindrical portion. The cylindrical member 12 is located radially inside of a coil 44 to surround the outer circumferential peripheries of both the movable core 26 and the stationary core 30. The first magnetic cylindrical member 14, the nonmagnetic cylindrical member 16, the second magnetic cylindrical member 18, the valve element 24, the movable core 26, the spring 28, the stationary core 30, and the coil 44 configure a solenoid valve in the fuel injection valve 10.

Figure 3:
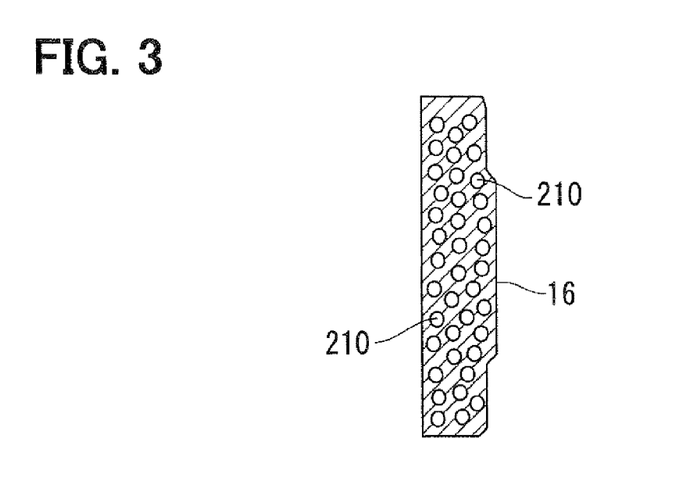
FIG. 3 is a schematic sectional view showing an example of a nonmagnetic cylindrical member of the fuel injection valve.

The first magnetic cylindrical member 14 surrounds the outer circumferential periphery of the movable core 26. The second magnetic cylindrical member 18 surrounds the outer circumferential periphery of the stationary core 30. Together with the movable core 26 and the stationary core 30, the first magnetic cylindrical member 14 and the second magnetic cylindrical member 18 form a magnetic circuit. The movable core 26 and the stationary core 30 therebetween define a gap 200. The nonmagnetic cylindrical member 16 surrounds radially outside of the gap 200 to restrict magnetic flux tom being short-circuited between the first magnetic cylindrical member 14 and the second magnetic cylindrical member 18. The first magnetic cylindrical member 14 and the second magnetic cylindrical member 18 are formed from a magnetic material such as electromagnetic stainless steel, SUS430, Fe—Co alloy, or the like. The nonmagnetic cylindrical member 16 is formed from a nonmagnetic material such as SUS304, SUS305, or the like. The first magnetic cylindrical member 14, the second magnetic cylindrical member 18, and the nonmagnetic cylindrical member 16 are preferably greater than or equal to 60 μΩ·m in specific resistance value. As shown in FIG. 3, the nonmagnetic cylindrical member 16 is formed from nonmagnetic metallic powder. Specifically, the nonmagnetic metallic powder is molded by metal injection molding (MIM) to be in a predetermined shape, and the molded form is thereafter sintered to be a product of the nonmagnetic cylindrical member 16. The nonmagnetic cylindrical member 16 is formed with pores 210 therein by sintering the molded form, which is produced by the MIM process.

The valve body 20 is fixed to an inner circumferential periphery of a tip end of the first magnetic cylindrical member 14 on the side of nozzle holes by welding or the like. A nozzle plate 22, which has the nozzle holes, is joined with an outer bottom surface of the valve body 20 by welding of the like. The valve body 20 has an inner circumferential periphery defining a valve seat 21 to which the valve element 24 is configured to be seated. The valve element 24 is a closed-end cylindrical hollow member, which is configured to be seated to the valve seat 21 of the valve body 20. When the valve element 24 is seated to the valve seat 21, the nozzle holes of the nozzle plate 22 are blockaded, whereby fuel injection is terminated. The valve element 24 has multiple fuel holes 24a each passing through a sidewall of the valve element 24. Fuel flows into the valve element 24, and the fuel flows out of the valve element 24 through the fuel holes 24a. The fuel is lead to a valve portion, which is configured with the valve element 24 and the valve seat 21.

The movable core 26 is fixed to the valve element 24 on the opposite side of the valve body 20 by welding or the like. The spring 28 as a biasing member applies load to the valve element 24 via the movable core 26 to bias the valve element 24 to be seated to the valve seat 21. The stationary core 30 as a magnetic opposed portion is substantially in a cylindrical shape and accommodated in the cylindrical member 12. The stationary core 30 is provided farther away from the valve body 20 than the movable core 26. The stationary core 30 is opposed to the movable core 26.

An adjusting pipe 32 is press-fitted to the stationary core 30 to retain one end of the spring 28. Load applied from the spring 28 is regulated by adjusting press-insertion of the adjusting pipe 32. Magnetic members 40 and 42 are located radially outside of the coil 44 and magnetically conducted with each other. The magnetic member 40 is magnetically conducted with the first magnetic cylindrical member 14. The magnetic member 42 is magnetically conducted with the second magnetic cylindrical member 18. The stationary core 30, the movable core 26, the first magnetic cylindrical member 14, the magnetic members 40, 42, and the second magnetic cylindrical member 18 form a magnetic circuit.

The coil 44 is wound around an outer circumferential periphery of a spool 46 to surround outer circumferential peripheries of the nonmagnetic cylindrical member 16 and the second magnetic cylindrical member 18. A resin housing 50 surrounds outer circumferential peripheries of the cylindrical member 12 and the coil 44. A terminal 52 is electrically connected with the coil 44 to conduct a driving current to the coil 44. A fuel filter 60 is accommodated in a fuel inlet of the cylindrical member 12 to remove a foreign matter from fuel, which flows into the fuel injection valve 10. Fuel flows into the fuel passage 100 through an upper portion of the cylindrical member 12 in FIG. 2. The fuel further flows through fuel passages, which are defined in the stationary core 30, the movable core 26, and the valve element 24. Thereafter, the fuel passes through the fuel holes 24a and a clearance, which is formed between the valve seat 21 and the valve element 24 when the valve element 24 is lifted from the valve seat 21, whereby the fuel is injected through a nozzle hole of the nozzle plate 22.

In the fuel injection valve 10, when the coil 44 is de-energized, the valve element 24 moves in a closing direction downward in FIG. 2 by being exerted with the load of the spring 28, whereby the valve element 24 is seated to the valve seat 21. Thus, the nozzle hole of the nozzle plate 22 is blockaded, and fuel injection is terminated. When the coil 44 is energized, magnetic flux flows through the magnetic circuit, which is formed of the stationary core 30, the movable core 26, the first magnetic cylindrical member 14, the magnetic members 40, 42, and the second magnetic cylindrical member 18. Thus, the movable core 26 and the stationary core 30 therebetween generate magnetic attractive force. Thus, together with the movable core 26, the valve element 24 moves against the load of the spring 28 toward the stationary core 30, whereby the valve element 24 is lifted from the valve seat 21. Thus, fuel is sprayed through the nozzle hole of the nozzle plate 22. The movable core 26 makes contact with the stationary core 30, thereby the lift of the valve element 24 is regulated.

Figure 4:
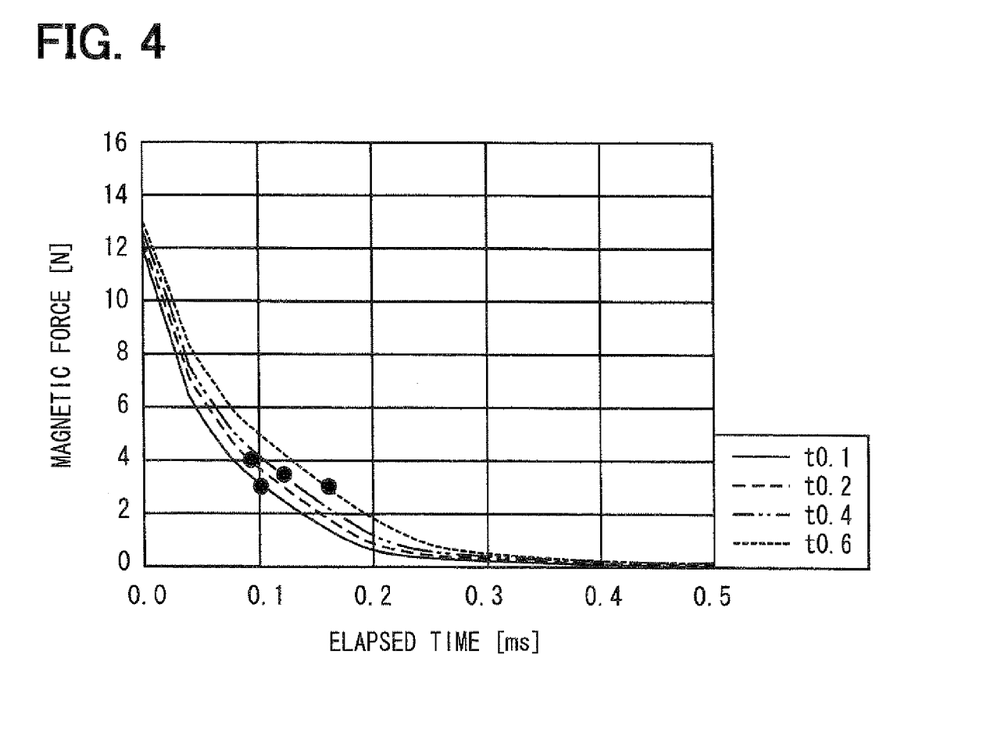
FIG. 4 is a graph showing relationships between magnetic force, which is exerted between the movable core and the stationary core, and elapsed time after de-energizing of a coil of the fuel injection valve.
Figure 5:
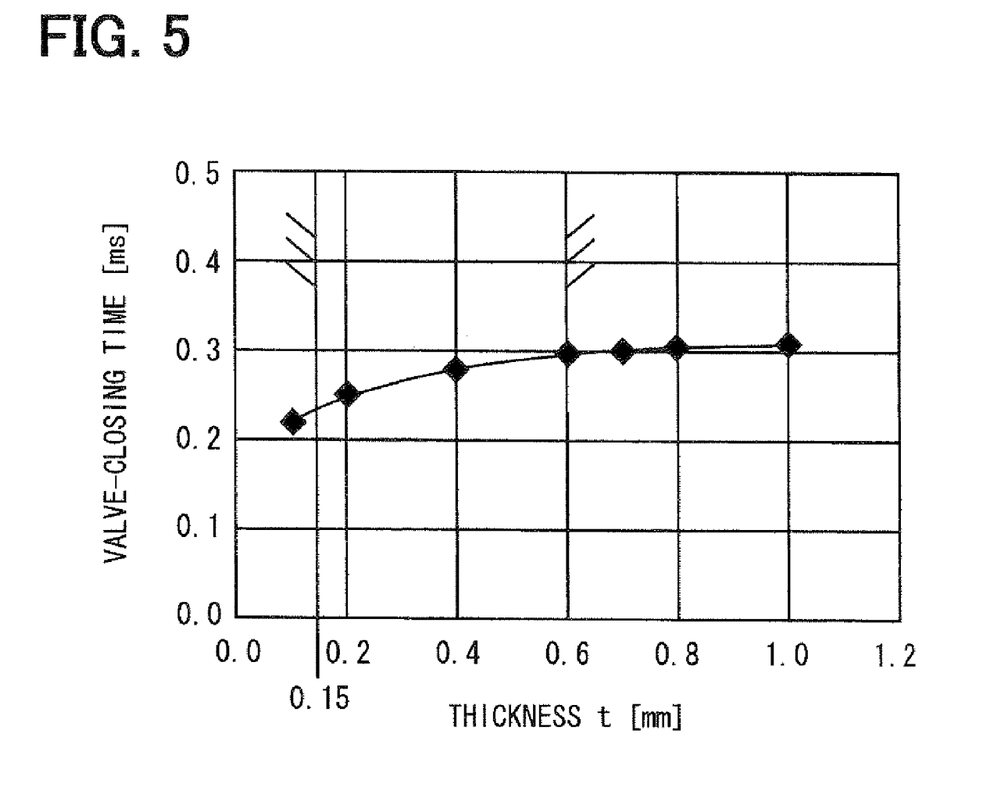
FIG. 5 is a graph showing a relationship between a thickness t of the nonmagnetic cylindrical member and a valve-closing time of the fuel injection valve.

FIG. 4 is a graph showing relationships between the magnetic attractive force as magnetic force, which is exerted between the movable core 26 and the stationary core 30, and elapsed time after de-energizing of the coil 44. In FIG. 4, the relationships are indicated correspondingly to values of a thickness t of the nonmagnetic cylindrical member 16 determined at 0.1 mm, 0.2 mm, 0.4 mm, and 0.6 mm. According to FIG. 4, as the thickness t of the nonmagnetic cylindrical member 16 becomes small, the magnetic attractive force, which is exerted between the movable core 26 and the stationary core 30, promptly decreases with respect to the elapsed time. Therefore, referring to FIG. 5, as the thickness t of the nonmagnetic cylindrical member 16 becomes small, a valve-closing time of the valve element 24 becomes short, since as the magnetic attractive force between the movable core 26 and the stationary core 30 decreases. The valve-closing time is defined between a time point, at which the coil 44 is de-energized, and a time point, at which the valve element 24 is seated to the valve seat 21 by being exerted with the load of the spring 28 whereby the fuel injection from the nozzle hole is terminated. According to FIG. 5, in a range, in which the thickness t is greater than 0.6 mm, the valve-closing time is not significantly reduced correspondingly to reduction in thickness t of the nonmagnetic cylindrical member 16.

Here, the nonmagnetic cylindrical member 16 has the thickness t. The stationary core 30 has a surrounded portion, which is surrounded by the nonmagnetic cylindrical member 16, and the surrounded portion of the stationary core 30 has a cross-sectional area S1. The second magnetic cylindrical member 18 has an overlap portion on the side of the nonmagnetic cylindrical member 16 with respect to an axial direction, and the overlap portion of the second magnetic cylindrical member 18 and the stationary core 30 have a total cross-sectional area S2. According to the present embodiment, the thickness t, the cross-sectional area S1, and the total cross-sectional area S2 are preferably determined to satisfy the following equations (1), (2).

$$0.15 \text{ mm} \leq t \leq 0.6 \text{ mm} \tag{1}$$

$$0.55 \leq (S1/S2) \leq 0.9 \tag{2}$$

In the present structure, the thickness t of the nonmagnetic cylindrical member 16, which is located on the radially outside of the gap 200, can be effectively reduced by regulating the upper limit of t≦0.6 mm to the thickness t of the nonmagnetic cylindrical member 16. Therefore, the volume of the nonmagnetic cylindrical member 16 is reduced, so that eddy current caused in the nonmagnetic cylindrical member 16 can be also reduced when the coil 44 is de-energized. In the present structure, the nonmagnetic cylindrical member 16, which is located on the radially outside of the gap 200, can be restricted from causing therein the eddy current. Therefore, magnetic components such as the movable core 26 and the stationary core 30 located in the vicinity of the gap 200 can be restricted from inducing magnetic flux, by reducing the eddy current. When the coil 44 is de-energized, magnetic flux passes between the movable core 26 and the stationary core 30 through the gap 200. In the present structure, the magnetic flux can be promptly eliminated in response to de-energization of the coil 44. Therefore, the magnetic attractive force exerted between the movable core 26 and the stationary core 30 can be promptly decreased in response to the de-energization. Consequently, response of the closing motion of the fuel injection valve 10 can be enhanced, whereby the valve-closing time can be reduced when the coil 44 is de-energized. Furthermore, mechanical strength of the nonmagnetic cylindrical member 16 can be secured by determining the lower limit of the thickness t of the nonmagnetic cylindrical member 16 to satisfy 0.15 mm≦t.

Here, as described above, the nonmagnetic cylindrical member 16 may be produced by metal injection molding (MIM) of nonmagnetic metallic powder and thereafter sintering the molded form. In the present manufacturing method, the pores 210 are formed inside the nonmagnetic cylindrical member 16, whereby the substantial volume of the nonmagnetic cylindrical member 16 can be reduced. Consequently, the eddy current caused in the nonmagnetic cylindrical member 16 when the coil 44 is de-energized can be further reduced.

In addition, the total cross-sectional area of both the stationary core 30 and the second magnetic cylindrical member 18 is possibly reduced by determining the cross-sectional area S1 and the total cross-sectional area S2 to satisfy the relationship of 0.55≦(S1/S2). In the present structure, electromagnetic energy retained in both the stationary core 30 and the second magnetic cylindrical member 18 can be possibly reduced. Thus, the magnetic flux, which passes between the movable core 26 and the stationary core 30, promptly disappears in response to the de-energization of the coil 44, so that the magnetic attractive force exerted between the movable core 26 the stationary core 30 also promptly decreases. Consequently, response of the fuel injection valve 10 when the coil 44 is de-energized can be enhanced.

The outer diameter of the second magnetic cylindrical member 18 is secured by determining the cross-sectional area S1 and the total cross-sectional area S2 to satisfy the relationship of (S1/S2)≦0.90. Thus, the outer diameter of the second magnetic cylindrical member 18 is sufficiently greater than the outer diameter of the stationary core 30. In a structure where the outer diameter of the second magnetic cylindrical member 18 is excessively reduced to be smaller than the outer diameter of the nonmagnetic cylindrical member 16, the coil 44 and the second magnetic cylindrical member 18 therebetween have a gap to cause resistance in the magnetic circuit. As the second magnetic cylindrical member 18 is further reduced, the gap becomes larger, and consequently the resistance caused by the gap in the magnetic circuit becomes large. As a result, the magnetic attractive force between the movable core 26 and the stationary core 30 decreases.

Therefore, according to the present embodiment, the cross-sectional area S1 and the total cross-sectional area S2 are determined to satisfy the relationship of $0.55 \leq (S1/S2) \leq 0.90$. That is, the lowest limit of the outer diameter of the overlap portion of the second magnetic cylindrical member 18 on the side of the nonmagnetic cylindrical member 16 is determined with respect to the outer diameter of the stationary core 30. In the present structure, the magnetic flux between the movable core 26 and the stationary core 30 promptly disappears when being de-energized, while the magnetic attractive force between the movable core 26 and the stationary core 30 is maintained.

In general, a fuel injection valve has a coil applied with a driving signal such as a pulse signal. In such a fuel injection valve, fuel injection quantity is controlled by manipulating a pulse width of the driving signal in a range, in which an injection rate characteristic is in proportion to the pulse width. However, when the response in the closing motion of the fuel injection valve is lowered, a time period between terminating of the driving signal and closing of the fuel injection valve to terminate fuel injection becomes long. Consequently, fuel injection quantity is hard to be controlled. For example, when fuel consumption is small in an idling operation, the pulse width of the driving signal applied to the coil becomes short. However, in a conventional fuel injection valve, when the pulse width of the driving signal becomes short, the pulse width is increased to inject extra fuel so as to secure required fuel injection quantity. Consequently, the internal combustion engine consumes excessive fuel.

By contrast, according to the present embodiment, the response of the closing motion of the fuel injection valve 10 can be enhanced. Therefore, an injection quantity can be maintained in proportion to the pulse width of an operation signal of the coil 44 at small injection quantity compared with a conventional structure. Thus, in the present structure, the injection quantity in idling operation can be reduced, whereby fuel consumption can be reduced.

In the cylindrical member 12 of the present embodiment, the first magnetic cylindrical member 14, the nonmagnetic cylindrical member 16, and the second magnetic cylindrical member 18 are initially separate components from each other. The first magnetic cylindrical member 14 is joined to the nonmagnetic cylindrical member 16 by welding. The nonmagnetic cylindrical member 16 is further joined with the second magnetic cylindrical member 18 by welding. Each of the first magnetic cylindrical member 14, the nonmagnetic cylindrical member 16, and the second magnetic cylindrical member 18, which is a component initially separate from another, can be formed by at least one of various processes such as sintering, cutting, and cold forging. Therefore, the cylindrical member 12, which is constructed of the first magnetic cylindrical member 14, the nonmagnetic cylindrical member 16, and the second magnetic cylindrical member 18, can be formed by combining the various processes such as sintering, cutting, and cold forging.

Second to Fourth Embodiments

Figure 6:
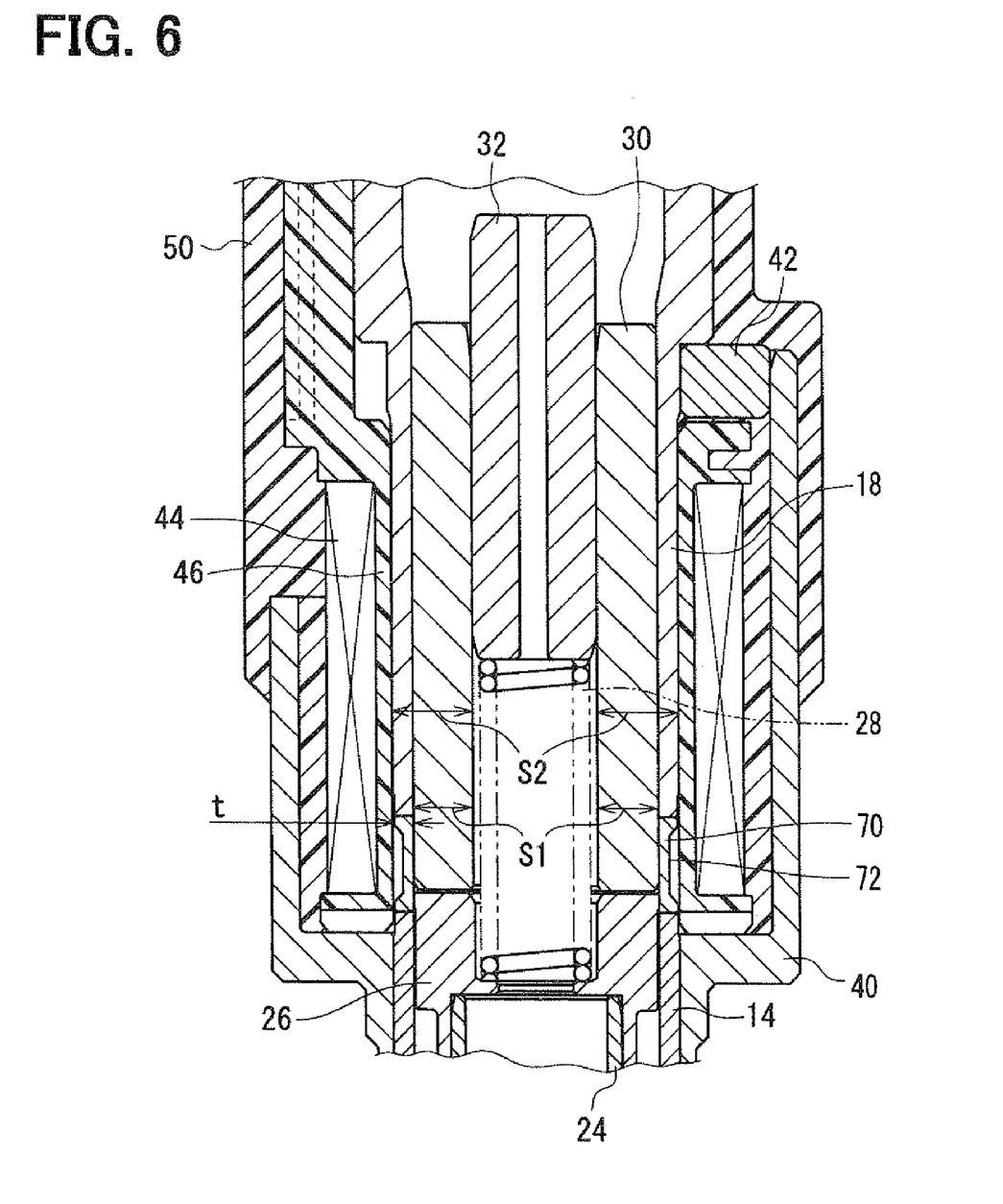
FIG. 6 is a sectional view showing a stationary core and a movable core, which are opposed to each other, in a fuel injection valve according to a second embodiment.

As shown in FIG. 6, according to the second embodiment, the outer circumferential periphery of a nonmagnetic cylindrical member 70 has a recess 72. The recess 72 is substantially in an annular shape and axially extends.

Figure 7:
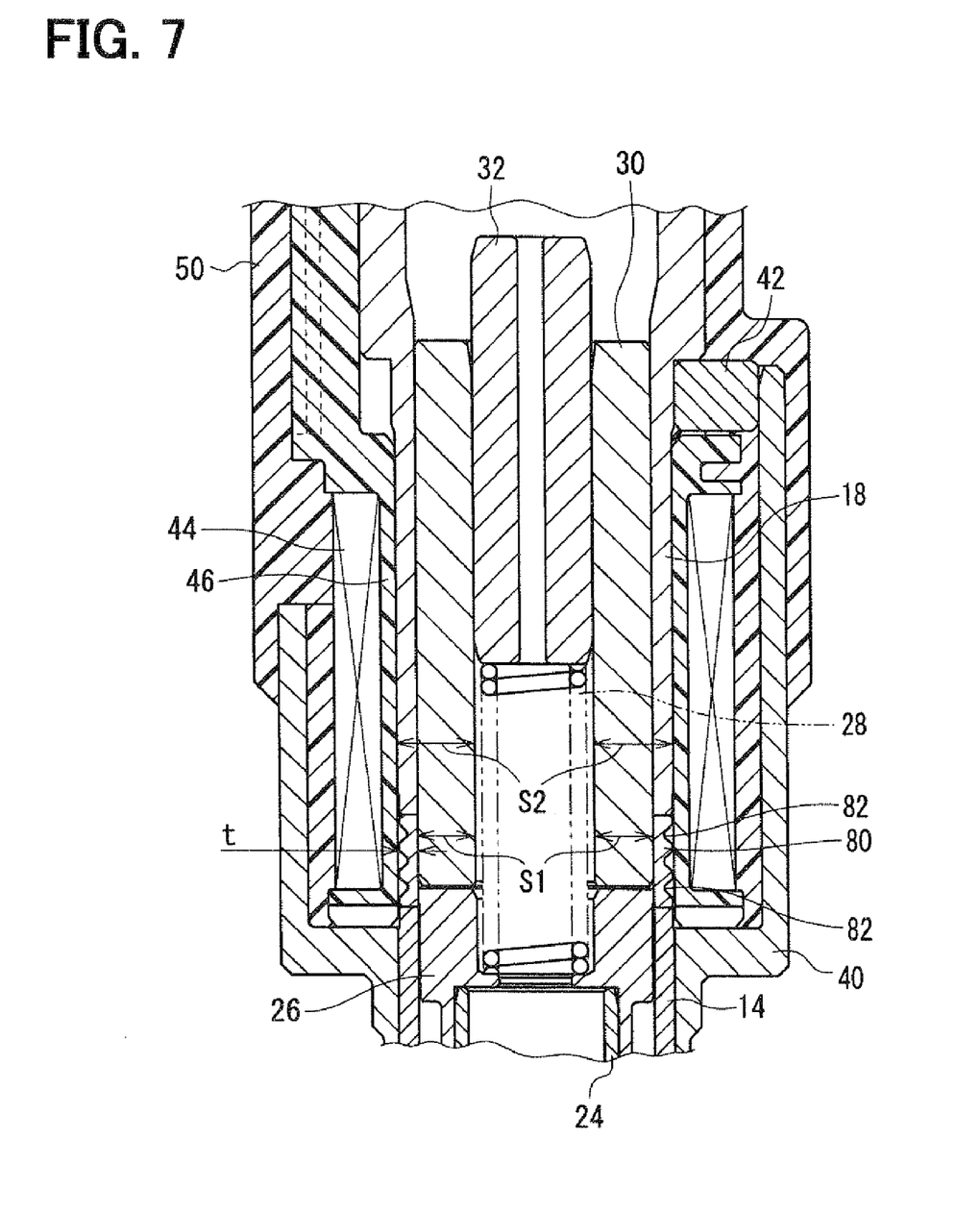
FIG. 7 is a sectional view showing a stationary core and a movable core, which are opposed to each other, in a fuel injection valve according to a third embodiment.

As shown in FIG. 7, according to the third embodiment, the outer circumferential periphery of a nonmagnetic cylindrical member 80 has multiple recesses 82 each being substantially in an annular shape. The outer circumferential periphery of the nonmagnetic cylindrical member 80 is in a wave shape in cross section. That is, the nonmagnetic cylindrical member 80 has a substantially corrugated outer periphery.

According to the second and third embodiments, the nonmagnetic cylindrical member 70, 80 having the recess 72, 82 are reduced in volume compared with the nonmagnetic cylindrical member 16 in the first embodiment. In the present structure, an eddy current caused in the nonmagnetic cylindrical member 70, 80 in response to the de-energization of the coil 44 can be reduced. Therefore, the magnetic attractive force between the movable core 26 and the stationary core 30 can be promptly eliminated in response to the de-energization of the coil 44. Thus, the response of the closing motion of the fuel injection valve 10 can be enhanced. According to the present second and third embodiments, the depth of the recess 72, 82 of the nonmagnetic cylindrical member 70, 80 is preferably less than or equal to 0.6 mm. The depth of the recess of the nonmagnetic cylindrical member 70, 80 is preferably greater than or equal to 0.15 mm.

Figure 8:
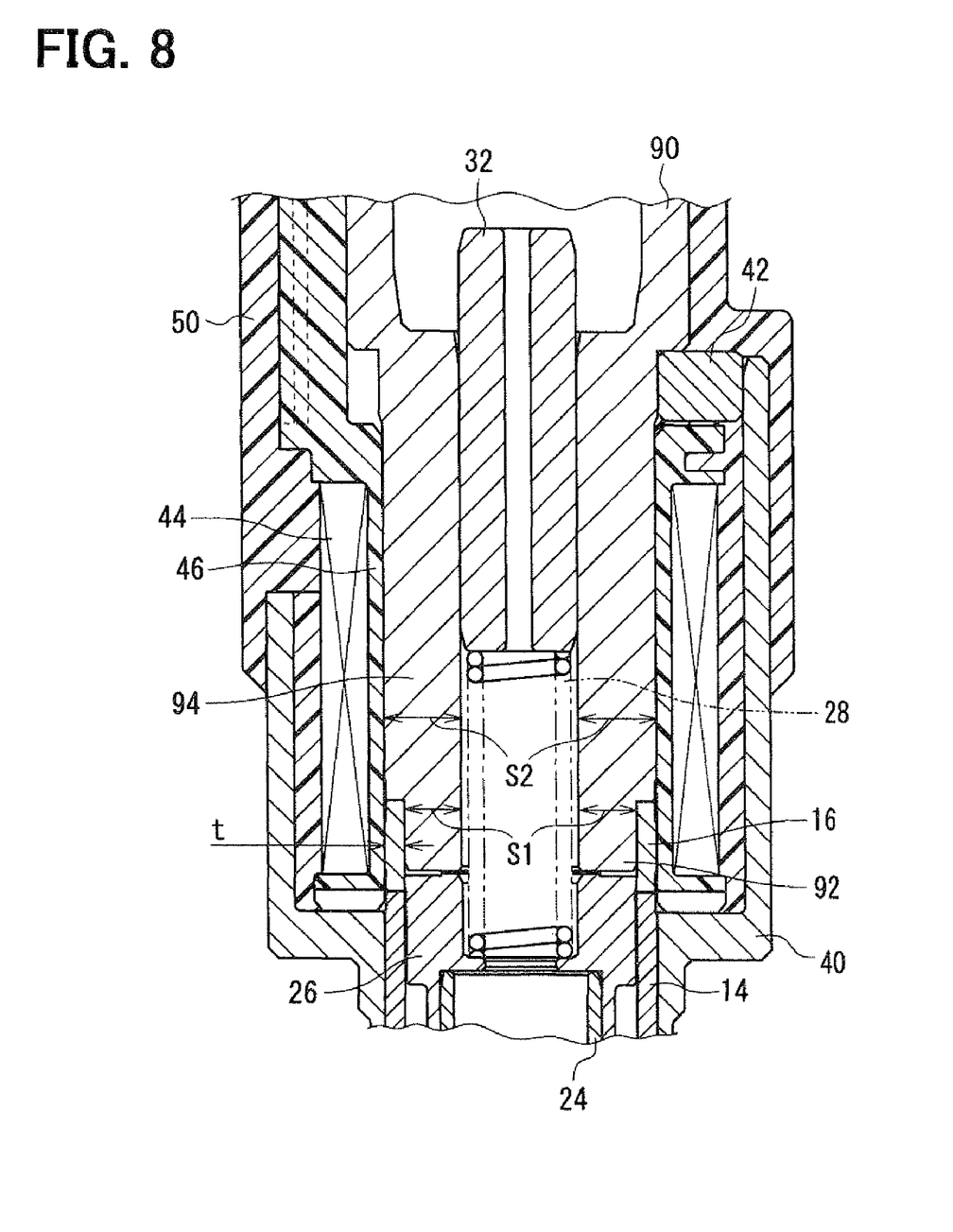
FIG. 8 is a sectional view showing a stationary core and a movable core, which are opposed to each other, in a fuel injection valve according to a fourth embodiment.

As shown in FIG. 8, according to the fourth embodiment, a magnetic opposed portion 92 and a second magnetic cylindrical portion 94 are integrally formed to be a single component as a stationary core 90. The magnetic opposed portion 92 is opposed to the movable core 26. The second magnetic cylindrical portion 94 is located farther away from the first magnetic cylindrical member 14 than the nonmagnetic cylindrical member 16 with respect to the axial direction. The second magnetic cylindrical portion 94 is located radially outside of the magnetic opposed portion 92. In the present structure, the number of components of the stationary core 90 can be reduced, whereby a manufacturing process of the fuel injection valve can be reduced.

The nonmagnetic cylindrical member 16 has the thickness t. The surrounded portion of the stationary core 30, which is surrounded by the nonmagnetic cylindrical member 16, has the cross-sectional area S1. The overlap portion of the second magnetic cylindrical member 18, which is located on the side of the nonmagnetic cylindrical member 16, and the stationary core 30 have the total cross-sectional area S2. According to the present embodiment the thickness t, the cross-sectional area S1, and the total cross-sectional area S2 are preferably determined to satisfy the relationships of $0.15 \text{ mm} \leq t \leq 0.6 \text{ mm}$ and $0.55 \leq (S1/S2) \leq 0.9$, similarly to the first to third embodiments.

Other Embodiment

In the above embodiments, the thickness t, the cross-sectional area S1, and the total cross-sectional area S2 are preferably determined to satisfy the relationships of $0.15 \text{ mm} \leq t \leq 0.6 \text{ mm}$ and $0.55 \leq (S1/S2) \leq 0.9$. The relationships need not be fully satisfied. It suffices to determine at least the thickness t so as to satisfy the relationship of $t \leq 0.6 \text{ mm}$. In a structure, in which the nonmagnetic cylindrical member is not provided with a recess, it suffices to determine the cross-sectional area S1 and the total cross-sectional area S2 so as to satisfy the relationship of $0.55 \leq (S1/S2)$, in addition to satisfying the relationship of $t \leq 0.6 \text{ mm}$.

In the above embodiments, the solenoid valve having the above-described structure is applied to the fuel injection valve. The above-described structure is not limited to the above-described solenoid valve and may be applied to any other solenoid valve, which requires high response when the being de-energized.

According to the above embodiments, the outer diameter of the nonmagnetic cylindrical member, the outer diameter of the first magnetic cylindrical member, and the outer diameter of the second magnetic cylindrical member are substantially equal to each other. Alternatively, at least one of the nonmagnetic cylindrical member, the first magnetic cylindrical member and the second magnetic cylindrical member may be different in outer diameter from the other.

In the first embodiment, the first magnetic cylindrical member 14, the nonmagnetic cylindrical member 16, and the second magnetic cylindrical member 18 are initially separate components and are integrated to one components by welding or the like. Alternatively, the cylindrical member 12 may be initially provided as a single magnetic component, which is formed of a magnetic compound material to be substantially in a cylindrical shape. In this case, a portion of the magnetic cylindrical member 12, which corresponds to the nonmagnetic cylindrical member, may be applied with, for example, quenching and demagnetized, whereby the de-magnetized portion of the magnetic cylindrical member 12 is configured to function as the nonmagnetic cylindrical member. In the present structure, the cylindrical member 12 is initially provided as the single component, consequently leakage of fuel through a seam between the cylindrical components can be further reduced. Furthermore, the number of components of the cylindrical member 12 can be reduced, whereby a manufacturing process of the fuel injection valve can be reduced.

In the second and third embodiments, the recess 72, 82 is provided in the outer circumferential periphery of the nonmagnetic cylindrical member 70, 80, thereby reducing the volume of the nonmagnetic cylindrical member 70, 80. Alternatively, a recess may be provided in the inner circumferential periphery of the nonmagnetic cylindrical member to reduce the volume of the nonmagnetic cylindrical member.

In the first to third embodiments, the outer diameter of the first magnetic cylindrical member 14 at a side of the nonmagnetic cylindrical member 16 and the outer diameter of the second magnetic cylindrical member 18 at a side of the nonmagnetic cylindrical member 16 may be greater than the outer diameter of the nonmagnetic cylindrical portion 16.

The above structures of the embodiments can be combined as appropriate. In particular, the second and third embodiments may be combined with the fourth embodiment. That is, the recess in the second and third embodiments may be provided to the nonmagnetic cylindrical member in the fourth embodiment.

Various modifications and alternations may be diversely made to the above embodiments without departing from the spirit of the present invention.

What is claimed is:

1. A solenoid valve comprising:
   a movable core;
   a valve element configured to move together with the movable core so as to control fluid communication;
   a magnetic opposed portion located farther away from the valve element than the movable core and opposed to the movable core, the magnetic opposed portion and the movable core being configured to therebetween define a gap;
   a nonmagnetic cylindrical portion surrounding radially outside of the gap;
   a first magnetic cylindrical portion located axially closer to the movable core than the nonmagnetic cylindrical portion;
   a second magnetic cylindrical portion located around an outer circumferential periphery of the magnetic opposed portion, the magnetic opposed portion being located axially farther away from the first magnetic cylindrical portion than the nonmagnetic cylindrical portion; and
   a coil located around an outer circumferential periphery of the nonmagnetic cylindrical portion, the coil being configured to generate magnetic attractive force between the magnetic opposed portion and the movable core when being energized,
   wherein the nonmagnetic cylindrical portion has a thickness t,
   the magnetic opposed portion has a cross-sectional area S1,
   the magnetic opposed portion and a cylindrical member, which retains the magnetic opposed portion and has the thickness t, have a total cross-sectional area S2,
   the thickness t, the cross-sectional area S1, and the total cross-sectional area S2 satisfy $t \leq 0.6$ mm and $0.55 \leq (S1/S2)$,
   the first magnetic cylindrical portion has a first outer diameter at a side of the nonmagnetic cylindrical portion,
   the second magnetic cylindrical portion has a second outer diameter at a side of the nonmagnetic cylindrical portion,
   the nonmagnetic cylindrical portion has a third outer diameter, and
   the first outer diameter and the second outer diameter are greater than the third outer diameter.

2. The solenoid valve according to claim 1, wherein the thickness t satisfies that $0.15 \text{ mm} \leq t \leq 0.6 \text{ mm}$.

3. The solenoid valve according to claim 1, wherein the cross-sectional area S1 and the total cross-sectional area S2 satisfy that $0.55 \leq (S1/S2) \leq 0.9$.

4. The solenoid valve according to claim 1, wherein the second magnetic cylindrical portion includes the cylindrical member.

5. The solenoid valve according to claim 1, wherein the nonmagnetic cylindrical portion, the first magnetic cylindrical portion, and the second magnetic cylindrical portion are welded to each other.

6. The solenoid valve according to claim 1,
   wherein the nonmagnetic cylindrical portion, the first magnetic cylindrical portion, and the second magnetic cylindrical portion are included in a single magnetic component, which is substantially in a cylindrical shape and formed of a magnetic compound material, and
   the nonmagnetic cylindrical portion is de-magnetized by being quenched.

7. A fuel injection valve comprising:
   the solenoid valve according to claim 1;
   a valve body having a valve seat located upstream of a nozzle hole, the valve element being configured to be seated to the valve seat; and
   a biasing member configured to exert load to the valve element toward the valve seat,
   wherein the movable core is configured to be attracted toward the magnetic opposed portion against the load of the biasing member when the coil is energized, and
   the valve element is configured to perform fuel injection by being lifted from the valve seat and terminate fuel injection by being seated to the valve seat.

8. The solenoid valve according to claim 1, wherein the magnetic opposed portion and the second magnetic cylindrical portion are included in a single component.

9. A solenoid valve comprising:
   a movable core;

a valve element configured to move together with the movable core so as to control fluid communication;

a magnetic opposed portion located farther away from the valve element than the movable core and opposed to the movable core, the magnetic opposed portion and the movable core being configured to therebetween define a gap;

a nonmagnetic cylindrical portion surrounding radially outside of the gap;

a first magnetic cylindrical portion located axially closer to the movable core than the nonmagnetic cylindrical portion;

a second magnetic cylindrical portion located around an outer circumferential periphery of the magnetic opposed portion, the magnetic opposed portion being located axially farther away from the first magnetic cylindrical portion than the nonmagnetic cylindrical portion; and a coil located around an outer circumferential periphery of the nonmagnetic cylindrical portion, the coil being configured to generate magnetic attractive force between the magnetic opposed portion and the movable core when being energized, wherein the nonmagnetic cylindrical portion has a thickness less than or equal to 0.6 mm, the nonmagnetic cylindrical portion has at least one recess, the at least one recess includes a plurality of recesses each being substantially in an annular shape, and the plurality of recesses are axially arranged to define a substantially corrugated surface.

10. The solenoid valve according to claim 9, wherein the first magnetic cylindrical portion has a first outer diameter at a side of the nonmagnetic cylindrical portion, the second magnetic cylindrical portion has a second outer diameter at a side of the nonmagnetic cylindrical portion, the nonmagnetic cylindrical portion has a third outer diameter, and the first outer diameter, the second outer diameter, and the third outer diameter are substantially equal to each other.

11. The solenoid valve according to claim 9, wherein the nonmagnetic cylindrical portion, the first magnetic cylindrical portion, and the second magnetic cylindrical portion are welded to each other.

12. The solenoid valve according to claim 9, wherein the nonmagnetic cylindrical portion, the first magnetic cylindrical portion, and the second magnetic cylindrical portion are included in a single magnetic component, which is substantially in a cylindrical shape and formed of a magnetic compound material, and the nonmagnetic cylindrical portion is de-magnetized by being quenched.

13. A fuel injection valve comprising:

the solenoid valve according to claim 9;

a valve body having a valve seat located upstream of a nozzle hole, the valve element being configured to be seated to the valve seat; and a biasing member configured to exert load to the valve element toward the valve seat, wherein the movable core is configured to be attracted toward the magnetic opposed portion against the load of the biasing member when the coil is energized, and the valve element is configured to perform fuel injection by being lifted from the valve seat and terminate fuel injection by being seated to the valve seat.

14. The solenoid valve according to claim 9, wherein the first magnetic cylindrical portion has a first outer diameter at a side of the nonmagnetic cylindrical portion, the second magnetic cylindrical portion has a second outer diameter at a side of the nonmagnetic cylindrical portion, the nonmagnetic cylindrical portion has a third outer diameter, and the first outer diameter and the second outer diameter are greater than the third outer diameter.

15. The solenoid valve according to claim 9, wherein the magnetic opposed portion and the second magnetic cylindrical portion are included in a single component.

* * * * *